Patented Dec. 3, 1929

1,737,905

UNITED STATES PATENT OFFICE

ARTHUR ZITSCHER AND FRANZ MURIS, OF OFFENBACH-ON-THE-MAIN, GERMANY, ASSIGNORS TO GENERAL ANILINE WORKS, INC., OF NEW YORK, N. Y., A CORPORATION OF DELAWARE

PROCESS OF PRODUCING FAST PRINTINGS

No Drawing. Application filed December 8, 1925, Serial No. 74,148, and in Germany December 24, 1924.

Our invention relates to a new process of producing fast printings consisting in fixing mixtures, containing alkali metal salts of azo components adapted for producing azodyestuffs on the fiber and salts of sulfnitrosaminic acids of the general formula:

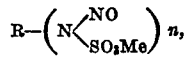

n being a number less than three and R being an organic radical containing at least one aromatic nucleus, on the fiber and in developing the dyestuffs in an appropriate manner on treating with an acid substance.

Such a development may be executed by treating the goods with acid vapors or by passing them in a bath containing a feeble acid, perhaps a feeble organic acid such as formic acid, or by passing in two baths, of which the first contains an acid or an acid salt, the second salts of feeble acids such as formates or acetates or an alkali. The process is each time to be adapted to the character of the sulfnitrosaminic acid in question.

In this manner printings completely fast to washing are produced, the azodyestuffs, thus formed, no longer containing the sulfonic group of the sulfnitrosaminic acids, which are their basis.

Regarding the well known instability of the sulfnitrosaminic salts especially in the dry state—see Ber. d. d. chem. Ges., vol. 28, page 3164 and vol. 30, pages 870, 874 and 880—it appears to be very surprising, that the sulfnitrosaminic salts, when mixed with the alkali metal salts of the azo components can withstand the process of drying and steaming to an extent sufficient for obtaining useful and full dyeings.

The process may be conducted also without starting from salts of the finished sulfnitrosaminic acids, but by producing them on the fiber, for example a mixture of an alkali metal salt of an arylsulfaminic acid of the general formula:

R—(NH—SO₂Me) n, n being a number less than three and R being an organic radical containing at least one aromatic nucleus, and of alkali metal nitrite, which forms the corresponding sulfnitrosaminic acid by treating subsequently with an acid substance, together with an alkali salt of the azo component being used for printing.

Among the salts of sulfnitrosaminic acids of arylamins, those of arylamins, having a substantive character, may be emphasized such as for example those of amino- or diamino compounds of diarylenes or of the aromatic series, containing an azo-, azoxy-, urea-, thiazol-, imidazol-, pseudoazimid or a similar group. Especially valuable printings are obtained by using salts of sulfnitrosaminic acids of aminoazobodies of the general formula:

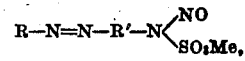

wherein R and R' mean aromatic residues which may be substituted or not.

As azo components adapted for producing azo dyestuffs on the fibre, the naphthols and their derivatives may be named, such as β-naphthol and its derivatives, such as acylaminonaphthols, for example the benzoylaminonaphthols and the arylids of 2.3-hydroxynaphthoic acid, the derivatives of 1-hydroxynaphthalene-4-carboxylic acid, described in U. S. A. Letters Patents No. 1,453,660 and bodies containing a methylene group capable of combining, for example the pyrazolon derivatives or derivatives of β-ketonaldehyde, such as the acylacetic acid arylids, the di- and monoacylacetoarylamins, described in the French Letters Patent No. 567,284 and others.

The production of the sulfaminic acids and of their nitroso compounds respectively may be executed according to the process, described in Ber. d. deutschen chem. Gesellschaft, vol. 28, page 3160 and vol. 30, page 880 and vol. 50, page 1117 respectively.

The new printing colors may be used for the multicolor printing besides the known nitrosamin printing colors.

The following examples illustrate the invention, the parts being by weight and all temperatures given being centigrades.

Example 1

21,5 grs. of dihydrothiotoluidinsulfaminic sodium (of 80% strength), which may be prepared according to Ber. d. deutsch. chem. Ges. vol. 30, page 880, are dissolved in
150 grs. of hot water, after cooling down by adding
14,5 grs. of hydrochloric acid ($d=1,160$) the free sulfaminic acid is separated. By adding a solution of
4 grs. of nitrite of sodium in
14 grs. of water the sulfnitrosaminic acid is formed, by pouring in
20 grs. of caustic soda solution (35° Bé.)

225 grs. of a paste are obtained.

225 grs. of this paste are worked up with
7,2 grs. of β-naphthol,
14,8 grs. of caustic soda solution (35° Bé.),
45 grs. of Turkey red oil,
208 grs. of water and
500 grs. of neutral starch tragacanth thickening to 1000 grs. of a printing paste.

The goods are printed, dried, steamed for 3 minutes, passed through a bath of 80°, containing 20 grs. of acetic acid of 8° Bé. in the liter, rinsed, soaped, rinsed and dried.

A yellowish red print is obtained.

Example 2

15 grs. of 5-nitro-2-anisidin-sulfaminic sodium of 90% of strength, which may be prepared according to Ber. d. deutsch. chem. Ges., vol. 30, page 880, are dissolved in
142 grs. of hot water, after cooling down by adding
14,5 grs. of hydrochloric acid ($d=1,160$) the free sulfaminic acid is separated, by adding a solution of
4 grs. of nitrite of sodium in
15 grs. of water the sulfnitrosaminic acid is formed, by adding
19,5 grs. of caustic soda solution of 35° Bé.

210 grs. of a paste are obtained.

210 grs. of this paste are worked up with
15 grs. of α-naphthalid of 2.3-hydroxynaphthoic acid,
15 grs. of caustic soda solution of 35° Bé.,
260 grs. of water and
500 grs. of a neutral starch tragacanth thickening to 1000 grs. of a printing paste.

The cotton goods are printed, dried, steamed for 3 minutes in a rapid steam-apparatus at 100–105°, then passed through a cold bath, containing 200 grs. of hydrochloric acid ($d=1,160$) in the liter, rinsed and passed again at 50° through a bath containing 50 grs. of acetate of sodium in the liter, rinsed, soaped, rinsed again and dried.

In this manner a red like claret print is obtained.

Example 3

20,5 grs. of meta-aminoazotoluene-sulfaminic sodium of the formula

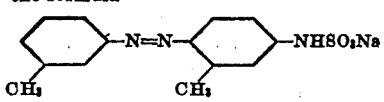

(of 80% strength) are worked up with
15 grs. of meta-nitranilid of 2.3-hydroxynaphthoic acid,
19,7 grs. of caustic soda solution of 35° Bé.,
3,8 grs. of nitrite of sodium,
45 grs. of Turkey red oil,
396 grs. of water and
500 grs. of a neutral starch tragacanth thickening to 1000 grs. of a printing paste.

The unprepared cotton goods are printed, dried, steamed for 3 minutes, passed through a hot bath of 90° containing 50 grs. of formic acid and 50 grs. of common salt in the liter, rinsed, soaped, rinsed again and dried.

A garnet like print is obtained.

Example 4

84 grs. of a paste of 50% of strength of phenetolazo-1-naphthyl-sulfnitrosaminic sodium (prepared according to Ber. d. deutsch. chem. Ges., vol. 28, page 3164 and vol. 50, page 1117 respectively) are worked up with
31 grs. of 2.3-hydroxynaphthoyl-meta-nitranilin,
50 grs. of Turkey red oil,
30 grs. of caustic soda solution of 36° Bé.,
305 grs. of water and
500 grs. of a neutral starch tragacanth thickening to 1000 grs. of a printing paste.

The cotton goods are printed, dried, steamed for 5 minutes, then passed through a bath, containing 50 grs. of hydrochloric acid of 22° Bé. in the liter, rinsed and subsequently passed through a bath, containing 8 grs. of caustic soda solution of 34° Bé. or a corresponding quantity of soda, then rinsed, soaped, rinsed again and dried.

A dark black print is obtained.

Example 5

47 grs. of ortho-anisol-azo-1-naphthylsulfaminic sodium of 80% of strength are made up with
26,5 grs. of the anilid of 2.3-hydroxynaphthoic acid,
10,5 grs. of nitrite of sodium,
50 grs. of Turkey red oil,
30 grs. of caustic soda solution of 36° Bé.,
336 grs. of water and
500 grs. of a neutral starch tragacanth thickening to 1000 grs.

The goods are printed, dried, steamed and passed through an acid and alkaline bath, as described in Example 4.

A reddish black print is obtained.

Example 6

14,5 grs. of meta'-meta'-dichlorobenzidin-disulfaminic sodium of 80% of strength are worked up with
15 grs. of meta-nitranilid of 2.3-hydroxynaphthoic acid,
19,7 grs. of caustic soda solution of 35° Bé.,
3,8 grs. of nitrite of sodium,
45 grs. of Turkey red oil,
402 grs. of water and
500 grs. of a neutral starch tragacanth thickening to 1000 grs. of a printing paste.

The unprepared cotton goods are printed, dried, steamed for 3 minutes and developed in a bath, as described in Example 3.

A bluish red print is obtained.

Example 7

21,5 grs. of dihydrothiotoluidin-sulfaminic sodium of 80% of strength are worked up with
13 grs. of the anilid of 2.3-hydroxynaphthoic acid,
19,7 grs. of caustic soda solution of 35° Bé.,
3,8 grs. of nitrite of sodium,
45 grs. of Turkey red oil,
397 grs. of water and
500 grs. of a neutral starch tragacanth thickening to 1000 grs. of a printing paste.

The cotton goods are printed, dried, steamed for 3 minutes, passed through a cold bath, containing 50 grs. of sulfuric acid of 66° Bé. in the liter, rinsed and passed at about 50° through a bath, containing 50 grs. of formate of sodium in the liter, rinsed, soaped, rinsed again and dried.

A red like claret print is obtained.

Example 8

21,5 grs. of dihydrothiotoluidin-sulfaminic sodium of 80% of strength are worked up with
12,5 grs. of 4-hydroxynaphthylphenylketon,
20 grs. of caustic soda solution of 35° Bé.,
4 grs. of nitrite of sodium,
45 grs. of Turkey red oil,
397 grs. of water and
500 grs. of a neutral starch tragacanth thickening to 1000 grs. of a printing paste.

The goods are printed, dried, steamed for 3 minutes, passed through a bath of 80°, containing 20 grs. of acetic acid of 8° Bé. in the liter, rinsed, soaped, rinsed and dried.

A bluish red print is obtained.

By the same process a reddish yellow print is obtained, when mixing to the printing paste an equivalent quantity of diacetoacetyl-ortho-tolidin instead of 4-hydroxynaphthylphenyl-keton.

*Example 9—two-color-printing*

(a) Printing color for black:

```
49    grs. of ortho-phenetol-azo-1-naphthylsulfaminic so-
      dium of 80% of strength are made up with
31    grs. of 2.3-hydroxynaphthoyl-meta-nitranilin,
10,5  grs. of nitrite of sodium,
50    grs. of Turkey red oil.
30,5  grs of caustic soda solution of 36° Bé.,
329   grs. of water and
500   grs. of a neutral starch tragacanth thickening to
1000 grs.
```

(b) Printing color for red:

```
120 grs. of a paste, containing 15% of the anilid of 2.3-
    hydroxy naphthoic acid, a nitrosamin alkali metal
    salt of 3-nitro-1.4-toluidin and free caustic soda so-
    lution, are mixed with
40  grs. of Turkey red oil,
100 grs. of a solution of a neutral chromate 1 : 4,
240 grs. of water and
500 grs. of a neutral starch tragacanth thickening to
1000 grs.
```

The goods are printed with the preceding colors, dried, steamed at 100° for 5 minutes with steam, containing acetic acid, then passed broadly through a bath, containing 30 grs. of bisulfate of sodium in the liter, rinsed, subsequently passed through an alkaline bath and worked up in the usual manner.

A two-color-print, a beautiful black besides red is obtained.

In the following claims the expression "an organic radical containing at least one aromatic nucleus" is intended to include organic radicals containing one or more aromatic nuclei of the benzene or naphthalene series and which may contain azo-, azoxy-, urea-, thiazol-, imidazol-, pseudoazimide or similar groups, and may be substituted by such groups as halogen, alkoxy groups, or carboxylic acid arylide groups, but not by sulfonic or carboxylic acid groups.

The expression "aromatic radical" is intended to include any radical of the benzene or naphthalene series, which may or may not be substituted, but which are free from sulfonic or carboxylic acid groups.

We claim:

1. In a process of producing fast printings the step comprising developing the color by reacting with an acidic substance upon a textile material impregnated with an alkali metal salt of an azo component suitable for the production of azo dyestuffs on the fiber, and a salt of a sulfnitrosaminic acid of the general formula:

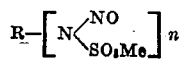

in which $n$ is a numeral less than 3 and R is an organic radical containing at least one aromatic nucleus.

2. In a process of producing fast printings the steps comprising printing upon a textile material an alkali metal salt of an azo component suitable for the production of azo dyestuffs on the fiber, and a salt of a sulfamic acid of the general formula:

$$R-[NH-SO_3Me]\,n$$

in which $n$ is a numeral less than 3 and R is an organic radical containing at least one aromatic nucleus, transforming the sulfaminic acid compound into the corresponding sulfnitrosaminic acid compound on the material and reacting with an acidic substance upon the so treated material.

3. In a process of producing fast printings the steps comprising printing upon a textile material an alkali metal salt of an azo component suitable for the production of azo dyestuffs on the fiber, an alkali metal nitrite and a salt of a sulfaminic acid of the general formula:

$$R-[NH-SO_3Me]\,n$$

in which $n$ is a numeral less than 3 and R is an organic radical containing at least one aromatic nucleus, and reacting with an acidic substance upon the so prepared material to produce the corresponding sulfnitrosaminic acid compound and to develop the dyestuff.

4. In a process of producing fast printings the step comprising developing the color by reacting with an acidic substance upon a textile material impregnated with an alkali metal salt of an azo component suitable for the production of azo dyestuffs on fiber, and a salt of a sulfnitrosaminic acid having substantive character and having the general formula:

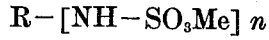

in which $n$ is a numeral less than 3 and R is an organic radical containing at least one aromatic nucleus.

5. In a process of producing fast printings the step comprising developing the color by reacting with an acidic substance upon a textile material impregnated with an alkali metal salt of a 2-3-hydroxynaphthoic acid arylid, and a salt of a sulfnitrosaminic acid of the general formula:

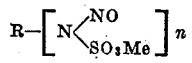

in which $n$ is a numeral less than 3 and R is an organic radical containing at least one aromatic nucleus.

In testimony whereof, we affix our signatures.

ARTHUR ZITSCHER.
FRANZ MURIS.